(No Model.)
H. W. HALES.
SHUTTER ATTACHMENT FOR PHOTOGRAPHIC CAMERAS.
No. 436,658. Patented Sept. 16, 1890.
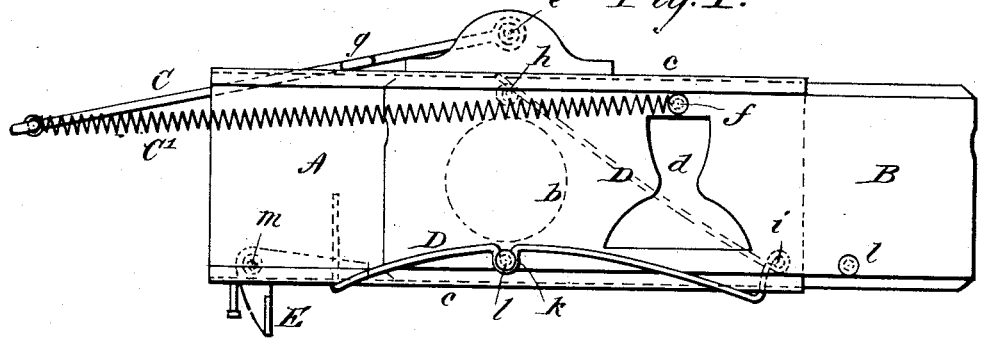
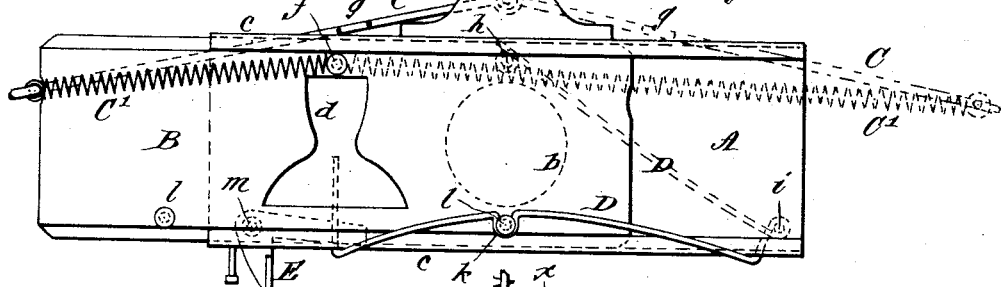
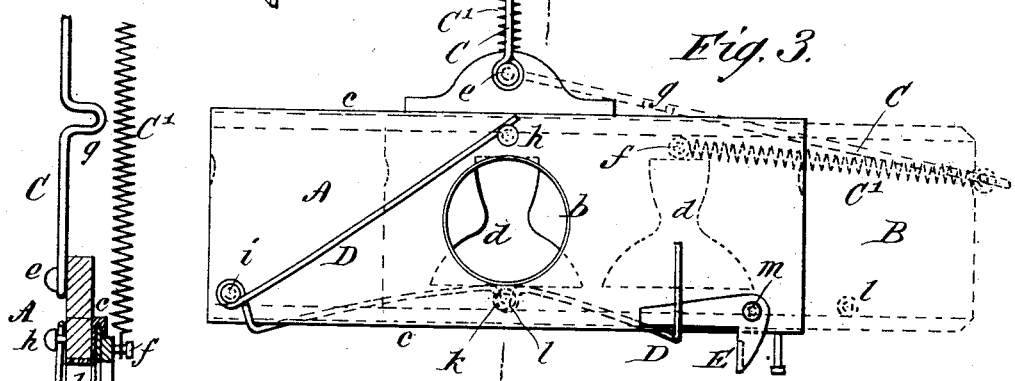
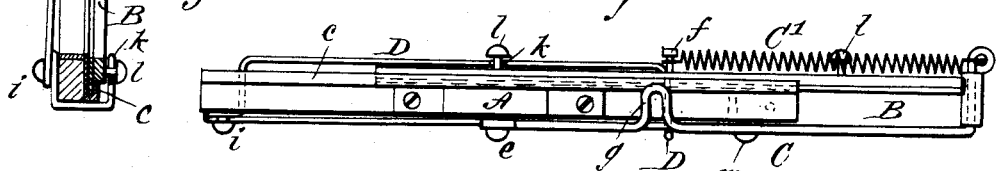
WITNESSES:
Donn Twitchell
E. M. Clark
INVENTOR:
H. W. Hales
BY
ATTORNEYS.

UNITED STATES PATENT OFFICE.

HENRY W. HALES, OF RIDGEWOOD, NEW JERSEY.

SHUTTER ATTACHMENT FOR PHOTOGRAPHIC CAMERAS.

SPECIFICATION forming part of Letters Patent No. 436,658, dated September 16, 1890.

Application filed May 4, 1889. Serial No. 309,554. (No model.)

*To all whom it may concern:*

Be it known that I, HENRY W. HALES, of Ridgewood, in the county of Bergen and State of New Jersey, have invented a new and useful Improvement in Shutter Attachments for Photographic Cameras, of which the following is a full, clear, and exact description.

This invention consists in a double-acting or reversely-operating sliding shutter with attached arm or lever and spring made capable of swinging to actuate the shutter from opposite ends to throw the shutter in either direction, and whereby the shutter is always self-setting as regards its closure of the lens-aperture to admit of the withdrawal of the slide of the plate-holder of the camera without risk of exposure of the plate till the shutter is shot.

The invention also includes a special automatic spring-catch for holding the shutter-slide at either end of its set, all substantially as hereinafter described, and pointed out in the claims.

The shutter is mainly designed for instantaneous work; but it may also be used for time exposures, as hereinafter set forth.

Reference is to be had to the accompanying drawings, forming a part of this specification, in which similar letters of reference indicate corresponding parts in all the figures.

Figure 1 represents a longitudinal front view of my improved shutter attachment with the shutter-slide as set and held closed and with its spring-operating device as thrown over to one end of said slide and under tension ready to shoot or throw the slide when released. Fig. 2 is a like view of the same, but representing by full lines the spring-operating device after it has been sprung or released and the shutter has been shot, say, from right to left, also showing by dotted lines the spring-operating device as thrown over to the opposite end of the shutter-slide ready for reversing the movement of the latter when required. Fig. 3 is a back or opposite face view of the attachment with the shutter-slide adjusted and held for making a time exposure, also showing by dotted lines the shutter-slide as set closed and its spring-operating device as thrown over to one end of said slide, but as sprung or not under tension. Fig. 4 is a vertical central transverse section taken mainly as indicated by the lines $xx$ in Fig. 3; and Fig. 5, a top or plan view of the shutter attachment with the shutter-slide as closed and with the spring-operating device as thrown over to end of said slide, but as sprung or not under tension.

A indicates a shutter-slide board, frame-piece, or carrier, which, as well as the shutter-slide B, may be made of wood, metal, hard rubber, or any other suitable material. This shutter-slide carrier is designed to occupy a horizontal position across the line of vision of the camera, and may be fitted, as by a central aperture $b$, on its back over the outer end of the lens-tube, or it may be otherwise applied to the camera to occupy an equivalent position so long as its opening $b$ is opposite the lens. Said carrier is provided on its one side or face with upper and lower slide-ways $c c$ for the shutter-slide B to move in and along over the opening $b$ in the carrier. The shutter-slide B is also provided with a central exposing-aperture $d$, which may be of any suitable shape, but which is here shown as of greater width below than above to adapt it to a sky and landscape exposure as said opening $d$ comes opposite or passes over the aperture $b$ in the carrier. A number of these slides having different-shaped exposing-apertures may be provided and readily substituted one for the other, according to the character of work to be done.

Pivoted to the shutter-slide carrier A in the center of its length, or thereabout, and preferably above and on the back of said carrier, as at $e$, is an arm or lever C of a length to extend some distance beyond either end of the carrier and bent at its outer end to embrace or cross either end of the shutter-slide B and to provide for the attachment to its outer end of a spring C', which may be of any suitable material, and the other end of which is attached, as at $f$, to the slide B in the center of the length of the latter. This arm or lever C, with its attached spring C', constitutes what I term the "spring-operating device" of the shutter-slide, and it may be variously constructed so long as it is made capable of being swung or thrown over to operate from opposite ends of the shutter attachment to throw the shutter-slide B to the right or to the left, or, in other words, to actuate it in reverse directions and from opposite ends, as required, in order to give the shutter-slide a double or reverse action, as desired, and as will be hereinafter more fully set forth. Any suitable means for regulating the tension of the spring of this device to give a quicker or slower throw to the shutter-slide may be applied, if desired. The arm or lever C is made with a crook or projection $g$, that, as said lever is thrown or swung over to opposite sides of its pivot, rests upon the shutter-slide carrier A.

D is a spring-catch that serves to hold the shutter-slide B when set. This spring-catch is represented as made of a piece of spring-wire, that, bearing at its one end upon a pin or stud $h$ on the carrier A, is twisted around a fulcrum-pin $i$ on the same side of the carrier near its one end, then bent over to come in front of the shutter-slide B and run along in front of the same in an arched or double and reversely inclined directions, with a loop $k$ in the middle of such arched portion of it adapted to engage by the tension of the spring with either one of two pins or projections $l\,l$ near the opposite ends of the shutter-slide B, according to which end said shutter-slide is projected. The other or remaining end of this spring D is bent back again to lap over from its under side the carrier A and there to form a stirrup adapted to receive the operating end of a releasing-trigger E, pivoted, as at $m$, to the carrier A, and which as it is operated serves to release the loop $k$ of the spring D from either of the pins $l\,l$ on the shutter-slide with which it may happen to be engaged. The normal position of the shutter-slide B is a closed one—that is to say, its exposing-aperture $d$ is either to one or other of the sides of and out of line with the exposing-aperture $b$ of the camera.

In the operation of the shutter attachment—as, for instance, when making instantaneous exposures—supposing the parts to be in the position represented in Fig. 1, then the shutter-slide B, which has its aperture $d$ to the right of the camera exposing-aperture $b$ and is held there by its left-hand pin $l$ engaging with the notch $k$ of the spring-catch D and has its spring-operating device C C' thrown over to the left subject to tension of its spring C', is ready to be shot to the left upon operating the trigger E to release the spring-catch D from the left-hand pin $l$ of the shutter-slide to the left, when the spring C' shoots the shutter-slide to the left, as shown by full lines in Fig. 2, bringing the aperture $d$ to and beyond the left-hand side of the camera exposing-aperture $b$, the spring C' then being relaxed, as shown at the left hand of Fig. 2, and the right-hand pin $l$ of the slide then having come into engagement with the notch $k$ of the spring-catch D. For a succeeding operation the spring-operating device C C' is then thrown over to the right, as shown by dotted lines in Fig. 2, with its spring C' under tension, and the trigger E operated to release the spring-catch D from its engagement with the right-hand pin $l$ of the shutter-slide, when said slide will be shot to the right, as shown in Fig. 1, after which the operation may be repeated as before, and so on alternately from opposite ends of the shutter-slide frame or carrier A, the spring C' relaxing at said ends after each shoot of the shutter-slide in reverse directions, as shown by full lines in Figs. 2 and 5, and the spring-catch D automatically engaging with the right and left hand pins $l\,l$ of the shutter-slide alternately to hold said slide while its spring-operating device is thrown over and put under tension alternately at opposite ends to shoot the shutter-slide alternately in reverse directions, as required. The exposure of course takes place during the passage of the aperture $d$ over the aperture $b$ in the shooting of the slide to the right or left, and, excepting when releasing the automatic spring-catch D, the shutter-slide will always be set closed. Focusing may be done either by direct hand manipulation of the shutter-slide or by a finder attached to the camera. For making a time exposure, then, the spring-catch D may be temporarily released from engagement with either pin $l\,l$ of the shutter-slide, and the spring-operating device C C' be turned into an upright position and the shutter-slide B be adjusted to bring its aperture $d$ over the aperture $b$, as shown by full lines in Fig. 3. The shutter-slide will then be held in such exposing position until its spring-operating device C C' is thrown to either side or end and the spring-catch D made to engage with one of the pins $l$ of the slide and the shutter moved out of exposing position, as shown by dotted lines in Fig. 3, for operation as before.

Having thus described my invention, what I claim as new, and desire to secure by Letters Patent, is—

1. In shutter attachments for photographic cameras, the combination, with an apertured shutter-slide arranged for operation in reverse directions alternately from or beyond opposite sides of the exposing-aperture of the camera, of a pivoted or swinging and reversible spring-operating device adapted to shoot the shutter-slide in reverse directions, as required, essentially as described.

2. In shutter attachments for photographic cameras, the combination of an apertured shutter-slide arranged for operation in reverse directions alternately from or beyond opposite sides of the exposing-aperture of the camera, a pivoted or swinging and reversible spring-operating device adapted to shoot the shutter-slide in reverse directions, as required, and a spring-catch adapted to automatically engage with said shutter-slide in both or reverse directions of its adjustment to opposite sides of the exposing-aperture of the camera, substantially as specified.

3. In shutter attachments for photographic cameras, the combination of the apertured shutter-slide carrier A, the apertured shutter-slide B working therein, and the shutter-slide spring-operating device C C', connected with said carrier and with said slide and reversible to and beyond opposite ends of the carrier for operation on the shutter-slide alternately in reverse directions, as herein set forth.

4. In shutter attachments for photographic cameras, the combination of the automatically-engaging spring-catch D with the shutter-slide carrier A, the apertured shutter-slide B, having pins or projections $l\ l$ for alternate engagement with said catch, and the reversible shutter-slide spring-operating device C C', essentially as specified.

HENRY W. HALES.

Witnesses:
  A. GREGORY,
  EDGAR TATE.